Jan. 27, 1970 R. D. KLETT 3,492,664

MAGNETIC CORE MEMORY

Filed Sept. 16, 1966 3 Sheets-Sheet 1

PRIOR ART

INVENTOR
Rolf Dieter Klett

BY Spencer & Kaye

ATTORNEYS

INVENTOR
Rolf Dieter Klett
BY Spencer & Kaye
ATTORNEYS

INVENTOR
Rolf Dieter Klett
BY Spencer & Kaye
ATTORNEYS 3,492,664
Patented Jan. 27, 1970

1

3,492,664

MAGNETIC CORE MEMORY

Rolf Dieter Klett, Constance, Germany, assignor to Telefunken Patentverwaltungsgesellschaft m.b.H., Ulm (Danube), Germany Filed Sept. 16, 1966, Ser. No. 579,986
Claims priority, application Germany, Sept. 17, 1965, T 29,419
Int. Cl. G11b 5/62
U.S. Cl. 340—174 5 Claims

ABSTRACT OF THE DISCLOSURE

A magnetic core memory composed of a plurality of core storage regions, a plurality of half-select row selection conductors passing through each row of cores in each storage region, a plurality of half-select column selection conductors passing through each column of cores in each storage region, inhibit line means passing through all of the cores, and release line conductors each passing through all of the cores of one of the storage regions, the operating reliability of the memory being improved, and its construction cost being reduced, by constituting the inhibit line means either by two inhibit lines each of which passes through half of the cores and each of which is connected in series with a respective one of the two pluralities of selection conductors, or by a single inhibit line connected in series with the plurality of release line conductors.

The present invention relates to storage means, and particularly to magnetic core memories composed of a plurality of storage regions, which in a special case may each be represented by a core matrix.

The present invention is particularly concerned with a magnetic core memory having a plurality of storage regions, each including a regular arrangement of magnetic cores, and two sets of selection conductors, one set being provided for each row of cores in the matrices and the other set being provided for each column of cores. Memories of the type involved in the present invention employ half-select currents applied to the row and column conductors for reading in and out of the memory. Such memories are further provided with inhibit lines for nullifying the effects of one of the sets of selection conductors in all of the storage regions for the period of time during which currents are being supplied to the selection conductors. Memories of this type further include a release line arrangement for each storage region for nullifying the action of the inhibit line in all of the magnetic cores of that particular storage region.

In magnetic core memories, it is known to exclude certain matrices, or storage regions, from the writing-in of information by means of so-called inhibit windings. A current equal in amplitude to a half-select current and oppositely directed to the writing current in its magnetic action, is passed through these windings and so as to prevent the writing-in. Conversely, this procedure can be used to suppress the reading out of a selected storage region. Generally, however, it is not desired to inhibit the reading of all of a plurality of storage regions, but rather to read out only one of a plurality of storage regions. In this case, current must be caused to flow through the inhibit windings of all of the storage regions except the one to be read. When $n$ storage regions are provided, therefore, in order to read one storage region, $n-1$ inhibit-winding drivers and lines, must be connected in addition to the $x$ and $y$ drivers and lines. In order to avoid the resulting heavy current, it has already been proposed to thread one inhibit winding, or line, through the magnetic cores of all the storage regions and to cancel the effect of this inhibit winding in the particular storage region to be read by means of a release winding, or line, associated with this storage region. (See Speiser: "Digitale Rechenanlagen" 1961, page 306.)

2

However, it has been found that such an arrangement presents certain disadvantages in that the memory will not operate properly unless the current in the inhibit winding traversing the entire memory is switched on at least during the same time as the $x$, or row and $y$, column selection currents. Since the inhibit winding has a higher inductance than the $x$ and $y$ lines, special measures must be taken to assure that current flow will begin in the inhibit winding at least as soon as it begins in the $x$ and $y$ lines.

It is therefore a primary object of the present invention to eliminate these disadvantages.

Another object of the present invention is to simplify the construction of core memories of this type.

A still further object of the present invention is to reduce the cost of construction of core memories of this type.

Yet another object of the present invention is to improve the operating reliability of such core memories.

These and other objects according to the present invention are achieved by the provision of a core memory composed of a plurality of storage regions each including a regular arrangement of magnetic cores disposed in a plurality of rows and columns, first winding means, inhibit line means, second winding means and connection means. The first winding means includes a plurality of half-select line selection conductors each passing through all of the cores disposed in a respective row of each of the storage regions, and a plurality of half-select column selection conductors each passing through all of the cores disposed in a respective column of each storage region. Each storage region may be constituted by one or several of the matrices forming the whole magnetic core memory or by partial matrix plane, if the whole magnetic core memory consists of a single core matrix. The inhibit line means passes through all of the cores and is provided for nullifying the effect of the first winding means. The second winding means includes a plurality of release line conductors each passing through all of the cores of a respective storage region for nullifying the effect of the inhibit line means on the cores of its associated storage region. Finally, the connection means connect the inhibit line means in series with one of the winding means.

According to one particular form of construction of the present invention, the inhibit line means includes two inhibit lines and the connection means are arranged to connect each inhibit line to a respective plurality of selection conductors.

In another form of construction according to the present invention, the inhibit line means are constituted by a single inhibit line and the connection means are arranged to connect the single inhibit line to all of the release line conductors.

Additional objects and advantages of the present invention will become apparent upon consideration of the following description when taken in conjunction with the accompanying drawings in which:

FIGURE 1 shows a magnetic-core memory provided with three storage regions, or matrices, $B_1$, $B_2$ and $B_3$.

Figure 1:
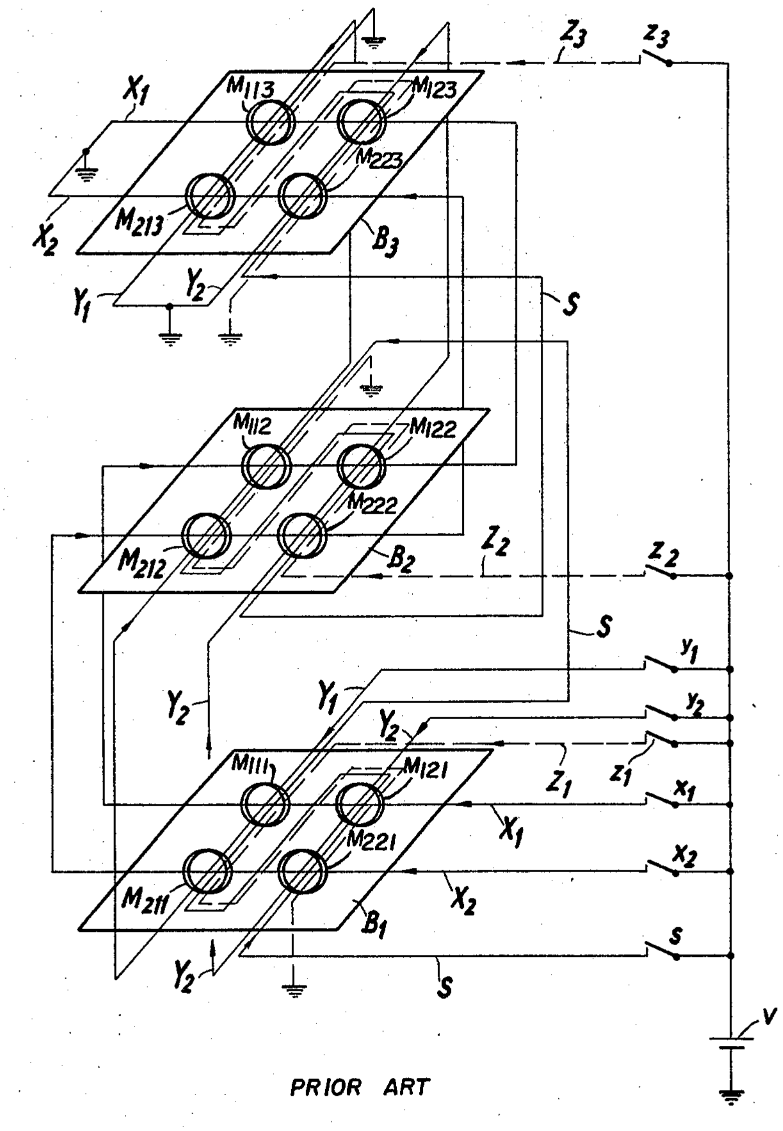
FIGURE 1 is a partially-pictorial, partially-schematic view of a core memory of the prior art type provided with one inhibit line and a plurality of release lines.

Each storage region of this device is shown to contain four magnetic cores $M_{xyz}$, $x$ denoting the particular $x$-row with which the core is associated, $y$ denoting the particular $y$-column, and $z$ the particular matrix. Each magnetic core $M_{xyz}$ is threaded by a respective column selection conductor $Y_1$ or $Y_2$ and a respective row selection conductor $X_1$ or $X_2$. Four selection conductors $X_1$, $X_2$, $Y_1$ and $Y_2$ are therefore required for selecting any one of the four magnetic cores defining each matrix B. Each selection conductor passes through the associated cores of all three matrices, with the conductor portions associated with the three matrices being connected in series. It should be appreciated that each matrix is shown to have only four cores for purposes of clarity, but that practical embodiments of such devices are intended to be constructed with a far larger number of cores, e.g., 64 cores in each matrix.

The memory is further provided with an inhibit winding S which traverses all of the cores of each matrix and with three release windings $Z_1$, $Z_2$ and $Z_3$, each of which traverses all of the cores of a respective matrix.

One end of each of the conductors and windings is connected to a respective driver, or switch, which is designated by a lower case letter which is the same as the capital letter designating its associated conductor or winding. All of the switches are connected to a voltage source V which is arranged to produce a voltage whose amplitude is sufficient to apply a current equal to the half-select current to each of the conductors and windings. The other end of each of the conductors and windings is connected to ground.

As is well known, a half-select current should have an amplitude equal to one-half that required to induce a flux sufficient to reverse the stable state of each core. The current amplitude required for causing each core to undergo such a polarity reversal will herein be identified as I and the resulting flux will be identified as F.

Upon the closing of one of the column selection switches $y_1$ or $y_2$ and one of the line selection switches $x_1$ or $x_2$, a magnetic flux F will be created in each core having the same X and Y coordinate values as the closed switches, unless the production of a flux having this amplitude is prevented by a current on one of the other conductors, or windings, traversing the core.

All of the magnetic cores are traversed by an inhibit winding S producing a flux which is opposite in direction to the flux produced by each of the selection conductors $X_1$, $X_2$, $Y_1$ and $Y_2$. Thus, when switch S is closed a current flows through line S to induce a flux in each core having an amplitude of $-F/2$. As a result, each of the cores will be subject to a flux level of either $F/2$, O, or $-F/2$, depending on whether the core is simultaneously being subjected to two half-select currents, one half-select current, or no half-select currents.

Then, if one of the switches $z_1$, $z_2$, or $z_3$ is closed, a release current having an amplitude of $I/2$ will be caused to flow over the associated release winding $Z_1$, $Z_2$ or $Z_3$, so as to induce a flux having a value of $+F/2$ in each core of this matrix, thus nullifying the effect of the inhibit winding on the cores of the particular matrix through which the release current flows.

As a result the full selection current I becomes effective in the X and Y selection lines in this matrix and the magnetic core selected by the closing of one $x$ switch and one $y$ switch is read. If the magnetic core $M_{xyz}=M_{212}$, for example, is to be read, then current pulses of the magnitude $I/2$ are applied simultaneously to the selection lines $X_2$ and $Y_1$, and to the release line $Z_2$. A current pulse, which appears earlier in comparison with the above mentioned pulses but which does not terminate at least until the termination of those pulses, is caused to flow through the inhibit line S. Thus, by the earlier connection of the inhibit line, which requires the provision of additional complex timing circuitry, allowance is made for the higher inductance of the inhibit line in comparison with the selection lines. Consequently, the selected magnetic cores $M_{213}$ and $M_{211}$, each support a flux level of $F/2$, and are not read, and the selected magnetic core $M_{212}$ supports a flux level of F and is read. The non-selected magnetic cores in the storage regions $B_1$ and $B_3$, on the other hand, support a flux level of O (cores $M_{221}$, $M_{111}$ and $M_{113}$) or $-F/2$ (cores $M_{121}$ and $M_{123}$), and those not selected in the storage region $B_2$ generate a flux level of $F/2$ (cores $M_{222}$ and $M_{112}$) or O (core $M_{122}$). The selection ratio is thus at least 2:1 in every case.

The drivers for each of the various lines and windings are represented by normally open single-pole, single-throw switches which are connected to a common voltage source V. The switches therefore bear designations equivalent to the designations of the memory lines controlled thereby. Since only the case of reading is under consideration, the voltage source V is shown as a direct-voltage source for purposes of simplicity.

Figure 2:
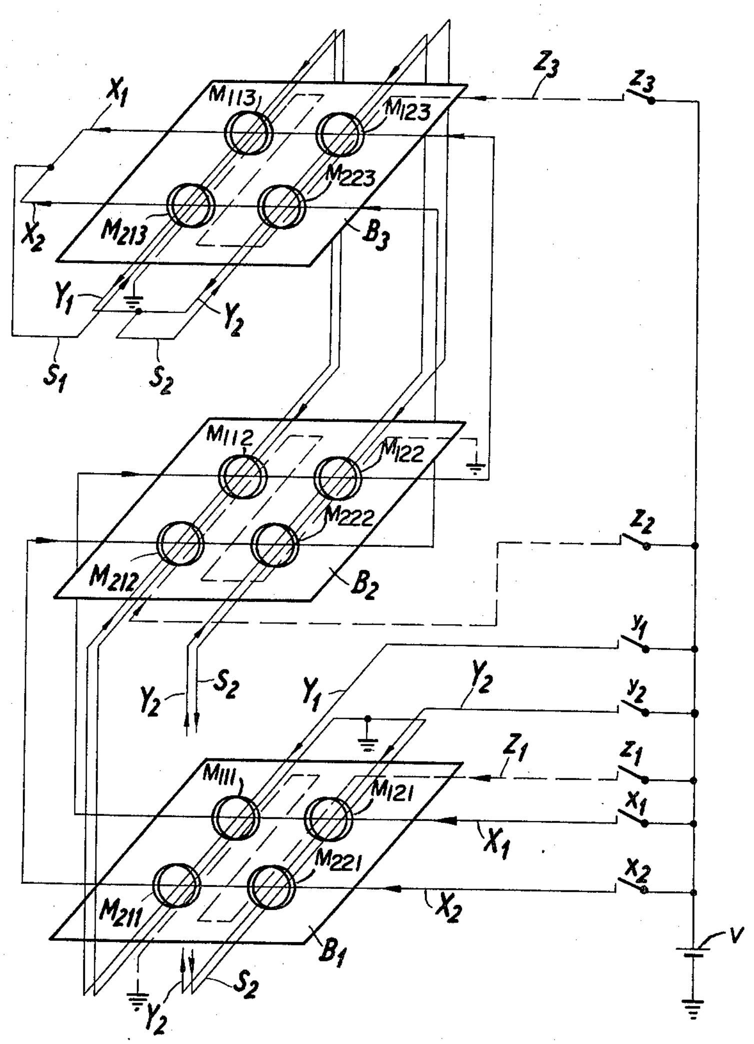
FIGURE 2 is a view similar to that of FIGURE 1 of a first embodiment of the present invention.

FIGURE 2 shows the magnetic-core memory of FIGURE 1 modified in accordance with the present invention. This arrangement differs from that of FIGURE 1 in that the inhibit line S of FIGURE 1 is here divided into two inhibit lines $S_1$ and $S_2$, the paths of the release lines $Z_1$, $Z_2$ and $Z_3$ are modified without changing the direction of release current flow through each core, and the contact S is omitted. The beginning of the inhibit line $S_1$ is connected to the electrical connection of the selection lines $X_1$ and $X_2$, and the inhibit line $S_2$ to the electrical connection of the selection lines $Y_1$ and $Y_2$. As a result, every X selection current pulse will flow through the line $S_1$, and every Y selection pulse will flow through the inhibit line $S_2$. Since every reading operation requires a pulse on one X line and one Y line, it will result that a current pulse will appear in both lines $S_1$ and $S_2$ during every read-in and read-out operation. Moreover the current pulses in lines $S_1$ and $S_2$ will always be automatically in time-coincidence with the pulses on the X and Y lines.

The currents in the inhibit lines $S_1$ and $S_2$ are thus identical, as regards their variation in time and their magnitude, with the currents in the associated selection lines. The requirement that the pulse in the inhibit line exists at least as long as the X and Y selection pulses, and have an amplitude of $I/2$, during this time is thus automatically fulfilled.

Thus, in comparison with the magnetic-core matrix store of FIGURE 1, the driver circuit for the inhibit line S and the control means for this driver circuit are eliminated.

Since the inhibit line S of the FIGURE 1 device traverses all the magnetic cores in the magnetic-core memory, it has a relatively high self-inductance. The resulting relatively slow rise of the current pulses in the inhibit line, thus, led to the necessity for the premature connection of the driver $s$ with respect to the X and Y drivers. In order to overcome the disadvantage of this high self-inductance, the inhibit line S is divided into two inhibit lines $S_1$ and $S_2$ according to the present invention. Each of these lines now only runs through half of the magnetic cores of the memory and so has only a fraction of the self-inductance of the inhibit line S. The remaining self-inductance results in a small increase in the time required for carrying out a read-in or read-out operation. However, this will not have any serious effect on the operation of the system in general.

According to another advantage of the present invention, as a result of the uniform loading of the particular X and Y selection lines, the susceptibility of the memory to faults is substantially reduced.

In order to explain the mode of operation of the magnetic-core memory of FIGURE 2, the selection of the magnetic core $M_{212}$ will again be considered. For this purpose, a $I/2$ pulse is applied simultaneously to each of the selection lines $X_2$ and $Y_1$ as well as to the release line $Z_2$. The magnetic core $M_{211}$ senses a current equal to $I_x+I_y-I_s=I/2$ under the assumption that $$I_x=I_y=I_s=I_z=I/2$$

The remaining magnetic cores in this storage region sense a current level of O (cores $M_{111}$ and $M_{221}$) or $-I/2$ (core $M_{121}$). The flux in the magnetic core $M_{212}$ in the storage region $B_2$ is produced by the current $$I_x+I_y-I_s+I_{z2}=I$$

and hence have a level of F. This magnetic core is therefore read. The remaining magnetic cores in the storage region $B_2$ have a flux of $F/2$ (Cores $M_{112}$ and $M_{222}$) or of O (core $M_{122}$) and therefore are not read. The flux conditions in the storage region $B_3$ correspond exactly to the conditions in the storage region $B_1$.

Figure 3:
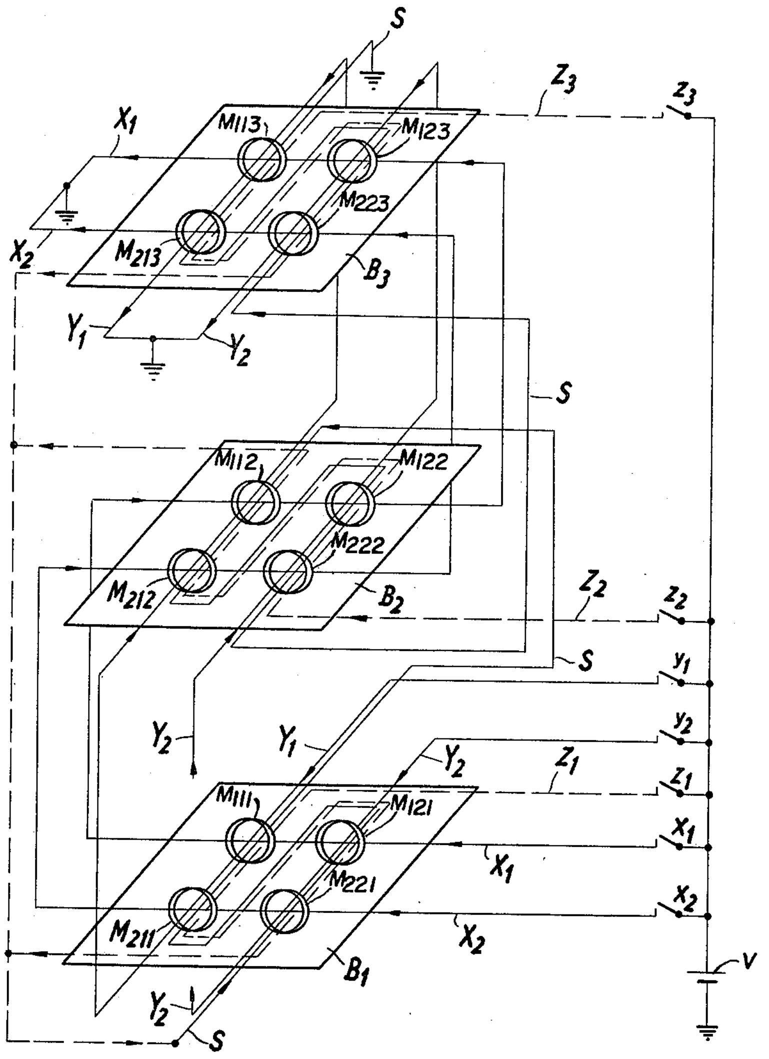
FIGURE 3 is a view similar to that of FIGURE 1 of a second embodiment of the present invention.

FIGURE 3 shows the magnetic core memory of FIGURE 1 in another modified form, according to the present invention. In this embodiment the X and Y selection lines are arranged as in the magnetic-core matrix store of FIGURE 1. The arrangement of the release lines $Z_1$, $Z_2$ and $Z_3$ and the inhibit line S is likewise unaltered. However, the ends of the release lines are not connected to ground, as in the arrangements of FIGURES 1 and 2, but lead jointly to the beginning of the inhibit line S, the other end of line S being connected to ground. Thus a current flows through the inhibit line when there is a current in one of the release lines $Z_1$ to $Z_3$. The driver for the inhibit line S is also eliminated in this embodiment.

As in the store of FIGURE 1, here, too, the full self-inductance of the inhibit line S is effective. In order to obtain reliable switching conditions, it is therefore necessary, for reading, to apply the release pulse to the particular release line Z sufficiently early that the latter, and hence also the inhibit line S, will be carrying the full pulse current when the particular X and Y drivers are selected.

The rest of the operation of the embodiment of FIGURE 3 is identical with that of FIGURE 1.

It will be understood that the above description of the present invention is susceptible to various modifications, changes, and adaptations.

What is claimed is:

1. A magnetic core memory comprising, in combination:

(a) a plurality of core storage regions each including a regular arrangement of magnetic cores disposed in a plurality of rows and columns;

(b) first winding means including a plurality of half-select row selection conductors each passing through all of said cores disposed in a respective row of each of said storage regions, and a plurality of half-select column selection conductors each passing through all of said cores disposed in a respective column of each of said storage regions;

(c) inhibit line means constituted by two inhibit lines each passing exclusively through half of said cores for nullifying the effect of said first winding means, there being only one inhibit line passing through each core;

(d) second winding means including a plurality of release line conductors each passing only through all of said cores of a respective one of said storage regions for nullifying the effect of said inhibit line means on said cores of its respective storage region; and (e) connection means connecting one of said inhibit lines in series with said plurality of row selection conductors and the other of said inhibit lines in series with said plurality of column selection conductors.

2. An arrangement as defined in claim 1 wherein one end of each of said row selection conductors is connected to a common point at which said connection means connects said one inhibit line, and one end of each of said column selection conductors is connected to a common point at which said connection means connects said other inhibit line.

3. A magnetic core memory comprising, in combination:

(a) a plurality of core storage regions each including a regular arrangement of magnetic cores disposed in a plurality or rows and columns;

(b) first winding means including a plurality of half-select row selection conductors each passing through all of said cores disposed in a respective row of each of said storage regions, and a plurality of half-select column selection conductors each passing through all of said cores disposed in a respective column of each of said storage regions;

(c) inhibit line means constituted by a single inhibit line passing through all of said cores for nullifying the effect of said first winding means;

(d) second winding means including a plurality of release line conductors each passing through all of said cores of a respective one of said storage regions for nullifying the effect of said inhibit line means on said cores of its respective storage region; and (e) connection means connecting said inhibit line in series with said second winding means.

4. An arrangement as defined in claim 3 wherein each of said release line conductors has one end connected to a common point at which said connection means connects said inhibit line.

5. An arrangement as defined in claim 1 further comprising means defining a ground for said memory, and wherein said connection means connects each said inhibit line between its associated common point and said means defining a ground.

References Cited

UNITED STATES PATENTS 3,110,888 11/1963 Kluck ............. 340—174

JAMES W. MOFFITT, Primary Examiner